United States Patent
Panella et al.

[11] Patent Number: 6,142,065
[45] Date of Patent: Nov. 7, 2000

[54] SYSTEM FOR CONTROLLING THE PASTEURIZATION HEAT TREATMENT, IN PARTICULAR OF PACKAGED FOOD PRODUCTS, IN TUNNEL-TYPE PASTEURIZERS

[75] Inventors: Graziano Panella, Grezzana; Giorgio Pasoli, Verona, both of Italy

[73] Assignee: SASIB S.p.A., Parma, Italy

[21] Appl. No.: 09/310,108

[22] Filed: May 12, 1999

[30] Foreign Application Priority Data

May 29, 1998 [IT] Italy ................ VR98A0049

[51] Int. Cl.[7] .............. A23L 1/00; A23L 3/00; A61L 2/04
[52] U.S. Cl. .............. 99/468; 99/330; 99/355; 99/361; 99/367; 99/371; 99/470; 99/477; 99/483
[58] Field of Search .............. 99/483, 467, 330, 99/470, 477, 452–455, 361, 362, 367, 368, 370, 371; 134/72, 131; 422/1, 26, 38, 292, 300, 307, 308; 426/401, 407, 521, 522

[56] References Cited

U.S. PATENT DOCUMENTS

| | | |
|---|---|---|
| 4,331,629 | 5/1982 | Huling .................. 99/361 X |
| 4,441,406 | 4/1984 | Becker et al. ............ 99/275 |
| 4,693,902 | 9/1987 | Richmond et al. ........ 99/483 X |
| 4,727,800 | 3/1988 | Richmond et al. ........ 99/361 |
| 4,841,457 | 6/1989 | Clyne et al. ........... 426/521 X |
| 4,849,235 | 7/1989 | Braymand . |
| 5,750,174 | 5/1998 | Lucassen .............. 99/470 X |
| 5,772,958 | 6/1998 | Nielsen ............... 422/38 X |

FOREIGN PATENT DOCUMENTS 1197934 10/1986 Italy .

*Primary Examiner*—Timothy Simone
*Attorney, Agent, or Firm*—Browdy and Neimark

[57] ABSTRACT

The pasteurization heat treatment control system according to the present invention, in the case of irregular operation of the pasteurizer, regulates the heat cycle by monitoring of the temperature of the product in suitable basic subzones of the pasteurizer and by evaluation of the temperature values of the product recorded upstream, intervening so as to ensure the continuation and conclusion of the pasteurization heat treatment of the product part which, at the time of interruption of operation, had already entered into the heat treatment zone.

This ensures that the product reaches the pasteurization temperature and that such temperature is maintained for a predetermined period of time independently of stoppage of the pasteurizer.

5 Claims, 5 Drawing Sheets

SYSTEM FOR CONTROLLING THE PASTEURIZATION HEAT TREATMENT, IN PARTICULAR OF PACKAGED FOOD PRODUCTS, IN TUNNEL-TYPE PASTEURIZERS

BACKGROUND OF THE INVENTION

1. Field of the Invention

The present invention relates to a system for controlling the pasteurization heat treatment, in particular of packaged food products, in tunnel-type pasteurizers.

2. Description of the Prior Art

As is known, the pasteurization of packaged food products consists in the heat treatment which some types of products already packaged in final containers undergo, in order to improve storage thereof over time.

The type of pasteurization which will be considered hereinbelow is "low-temperature pasteurization" and with specific reference to food products consisting of beverages. This means that it is performed at a temperature of lower than 90° C. by means of hot water which is sprayed in a programmed manner onto the containers in order to modify their temperature in accordance with a given heat cycle.

The apparatus by means of which the pasteurization process is performed essentially consists of a tunnel through which the product already packaged in the container (bottle, can or other container) is treated. From the thermal point of view, the tunnel is essentially subdivided into three zones: a first subheating zone (zone 1) where the temperature of the product is increased up to a value beyond which the actual heat treatment takes place; a second heat treatment zone (zone 2); a third cooling zone (zone 3) where the product is brought back down to about room temperature in order to avoid undesirable fermentation phenomena.

Each of these three zones is further subdivided into two or more parts for the purpose of: (a) avoiding sudden jumps in temperature and allowing the possibility of thermal recovery between the heating and cooling zones, or (b) being able to provide zones with different temperatures which are variable in accordance with a given logic, in the portion of the tunnel where the actual heat treatment occurs.

As previously mentioned, during pasteurization the product is initially heated to a certain temperature (zone 1), is then further heated up to the pasteurization temperature and kept at this pasteurization temperature for a certain predefined period of time (zone 2) and finally is cooled to a temperature close to room temperature (zone 3).

The problem arises when, for certain reasons, the product stops inside the tunnel (for example because the conveyor stops). In this case, the correct time/temperature ratio is no longer present and the product could then undergo heat treatment which is not as programmed.

Traditionally this problem is solved by regulating the temperature of the water in zone 2.

When the pasteurizer stops, a system for cooling the sprinkler water in zone 2 is automatically activated, as is known, with the aim of cooling as rapidly as possible the product to a temperature of about 50° C. At this temperature, in fact, no bactericidal effect is obtained (conventionally) and the product does not undergo any alteration from an organoleptic point of view.

When the conveyor starts to move again inside the pasteurizer tunnel, the temperature in zone 2 is restored equally rapidly, in order to resume the heat treatment interrupted previously.

Obviously, in this way it is not possible to avoid the negative effects of the fluctuations, because, no matter how rapid the variations in temperature of the sprinkler water, the temperature of the product is unable to vary with the same rapidity (on account of the thermal inertia).

The outcome, therefore, is a heat cycle which is not very uniform, but which is nevertheless able to allow the product to accumulate a sufficient number of PU's (pasteurization units).

According to that disclosed in Italian patent No. 1,197,934 (entitled "Method and device for the pasteurization of food products contained in receptacles", filed on Oct. 29, 1986 in the name of Societé Nouvelle Baele Gangloff) the pasteurization heat cycle is based on the fact that the activation of the cooling systems is not linked directly to stoppage of the conveyor inside the pasteurization tunnel, but instead on the attainment of the number of PU's accumulated by the product in a particular control point located in each of the subzones into which the heat treatment zone 2 is subdivided.

The evaluation of the number of PU's accumulated by the product at the control points is obtained by means of mathematical calculation.

The drawback of this system is that the parameter which is verified is only the number of PU's accumulated, without taking into account the fact that these PU's could have been accumulated by a product which has been kept at a temperature lower than the pasteurization temperature.

This does not ensure, consequently, that the product has actually undergone the programmed heat treatment. Basically, in accordance with the known art, the completeness of the pasteurization heat treatment is deduced from the number of PU's accumulated by the product.

No attention is given, however, to the way in which these PU's are accumulated and consequently to the drawbacks which may arise therefrom in particular in relation to correctly maintaining the organoleptic characteristics of the treated product.

SUMMARY OF THE INVENTION

The main object of the present invention is therefore that of overcoming the drawbacks associated with the art known hitherto, by providing a system for controlling the pasteurization heat treatment based exclusively on monitoring the temperature of the product and not, as traditionally occurs, on the calculation of the number of PU's accumulated.

A further object of the invention is that of providing, for the whole heat treatment cycle, a single product heating stage followed by a single product cooling stage. Attainment of the objects indicated results in a correct and complete pasteurization process for the product independently of any unprogrammed stoppages of the conveyor inside the pasteurizer tunnel.

Moreover the complete absence of alternate stages of successive heating/cooling of the product, as has occurred hitherto, avoids possible undesirable negative effects on the organoleptic properties of the product, in addition to considerable savings in energy.

The objects indicated, together with others, are all achieved by the system for controlling the pasteurization heat treatment, in particular of packaged food products, in tunnel-type pasteurizers in question, the main characteristic features of which are indicated in the claims which follow.

BRIEF DESCRIPTION OF THE DRAWINGS

Further characteristic features and advantages of the invention will emerge more clearly from the description which follows with reference to the accompanying drawings, provided purely by way of a non-limiting example, in which.

DETAILED DESCRIPTION OF THE PREFERRED EMBODIMENTS

Figure 1:
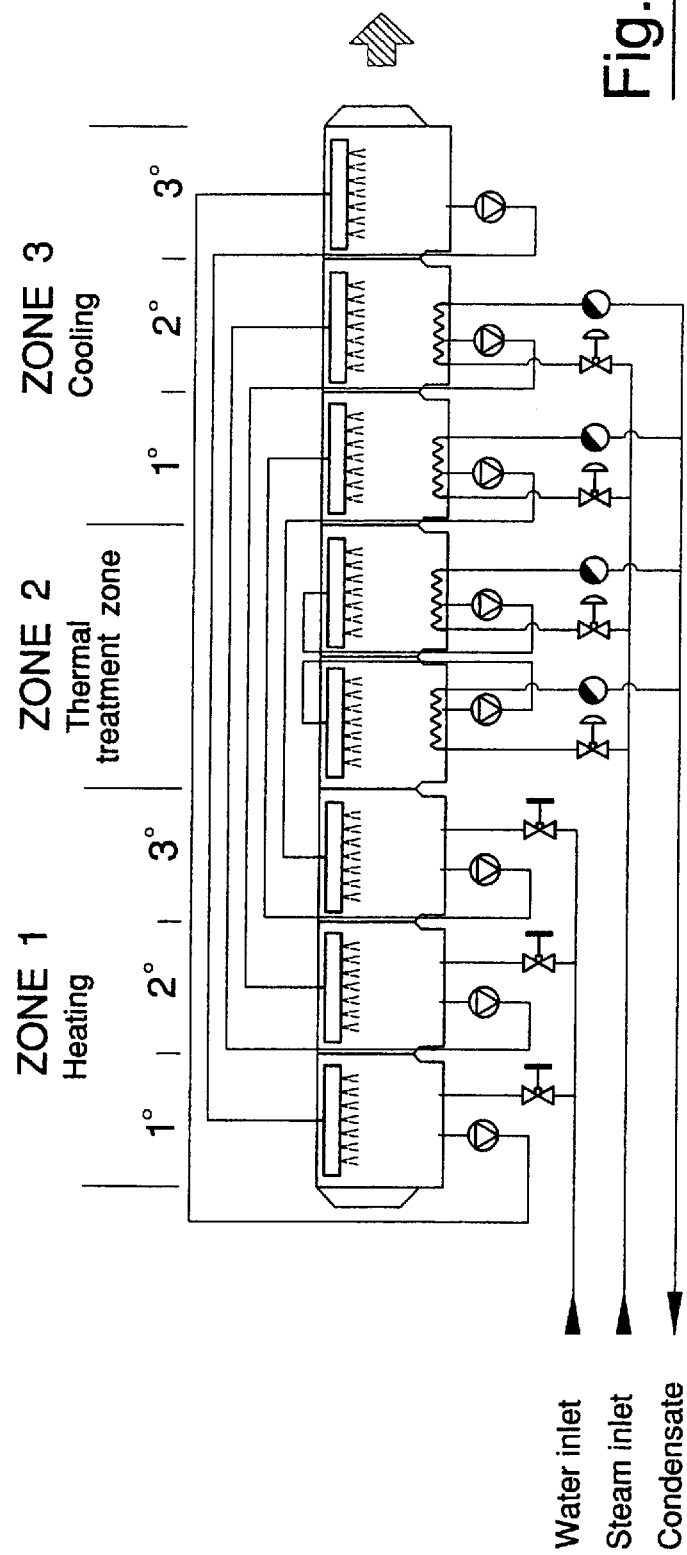
FIG. 1 shows schematically the hydraulic circuits of a tunnel-type pasteurizer and the associated temperature diagram of the sprinkler water and the product (the latter indicated by broken lines)
Figure 1:
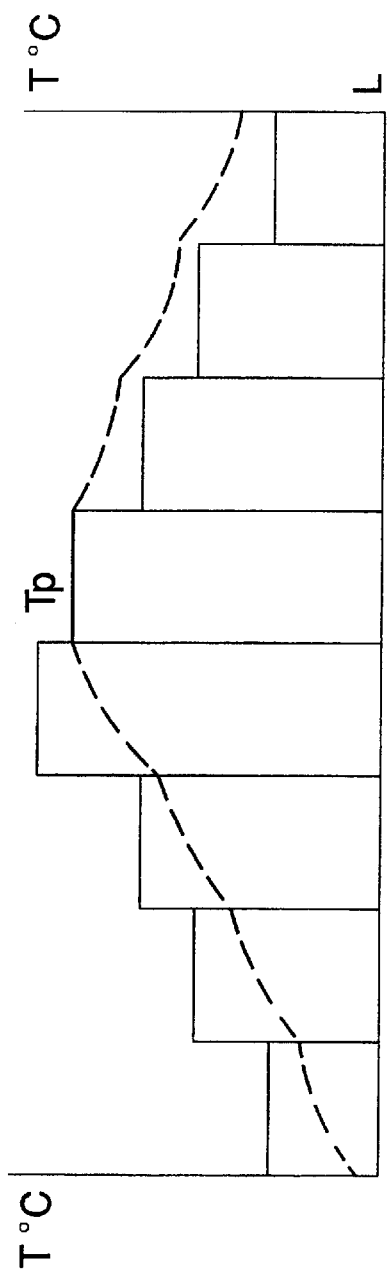
Figure 2:
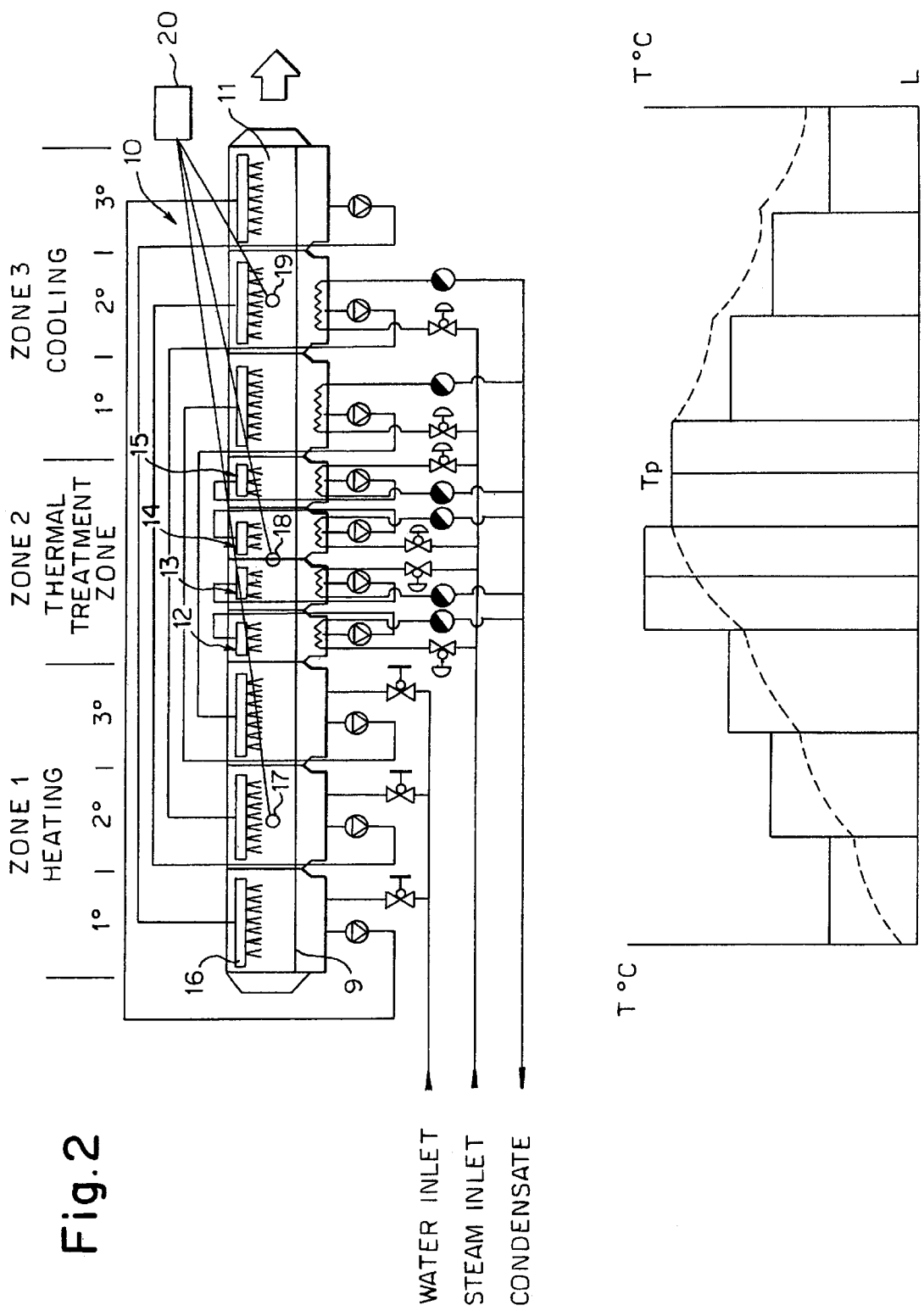
FIG. 2 is similar to FIG. 1, but the heat treatment zone 2 is subdivided into four subzones.

With reference to the accompanying drawings, the pasteurizer tunnel 11 having a conveyor 9 to feed the product to be pasteurized is regarded as being subdivided along its length into a number of basic zones 1, 2, 3 and the heat treatment zone 2 subdivided (in the case in question) into four thermally independent subzones 12, 13, 14, 15 (see FIG. 2), and a suitable data detection (and processing) apparatus 10 is able to measure, calculate, record and adjust the temperature in each of the basic zones 1, 2, 3.

This apparatus 10 is known per se (and consists of probes 17, 18, 19 connected to a computer 20). The position of apparatus 10 is not shown exactly (although it gnerally must be located in the zones or the subzones which are of interest) since its position may depend on the various functional and operational requirements. The temperature values measured and recorded by apparatus 10 are constantly compared with set values (i.e. predefined values) defined for a characteristic point of each of the subzones 12, 13, 14, 15 of the heat treatment zone 2.

If the product reaches this pasteurization temperature for the first time in its life, it is kept at this temperature for a given period of time, after which the system intervenes and the temperature of the water of the spray jets 16 in this zone 2 is lowered and remains low until the product batch has left the zone considered.

If the product passes through one of these control points (at the start of each zone), having already completed its heat cycle (recorded by the calculation and recording of apparatus 10), the temperature of this zone will remain low if it was already in this state, or it will drop if it was at a normal operating value.

When operation of the pasteurizer is normal, the product never exceeds the pasteurization temperature in thermal treatment zone 2 and the correct time/temperature ratio is maintained by apparatus 10 owing to the predefined speed of travel of the product inside the tunnel.

This control system therefore does not have as a sole aim that of ensuring a correct number of PU's, but tends to ensure for the product: (a) a single heating stage; (b) reaching of the predefined pasteurization temperature; (c) keeping of the product at said temperature for a predefined period of time; and (d) a single cooling stage.

The direct consequence is a heat cycle which substantially maintains the characteristics of the planned heat cycle.

Figure 3:
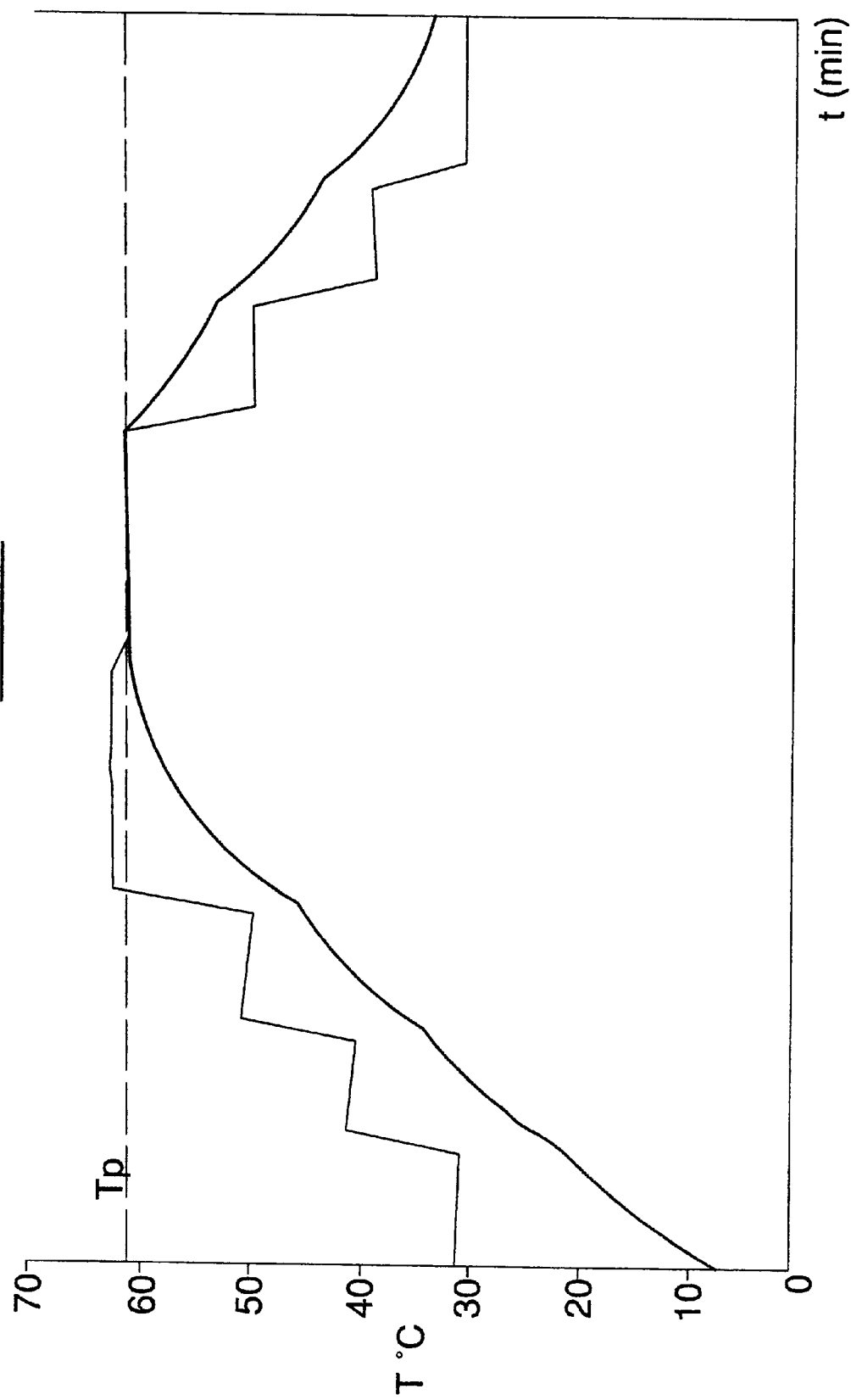
FIG. 3 shows a theoretical temperature diagram of the pasteurization cycle.

By way of example, FIG. 3 shows the progression of a heat cycle which corresponds perfectly to the planned cycle.

Figure 5:
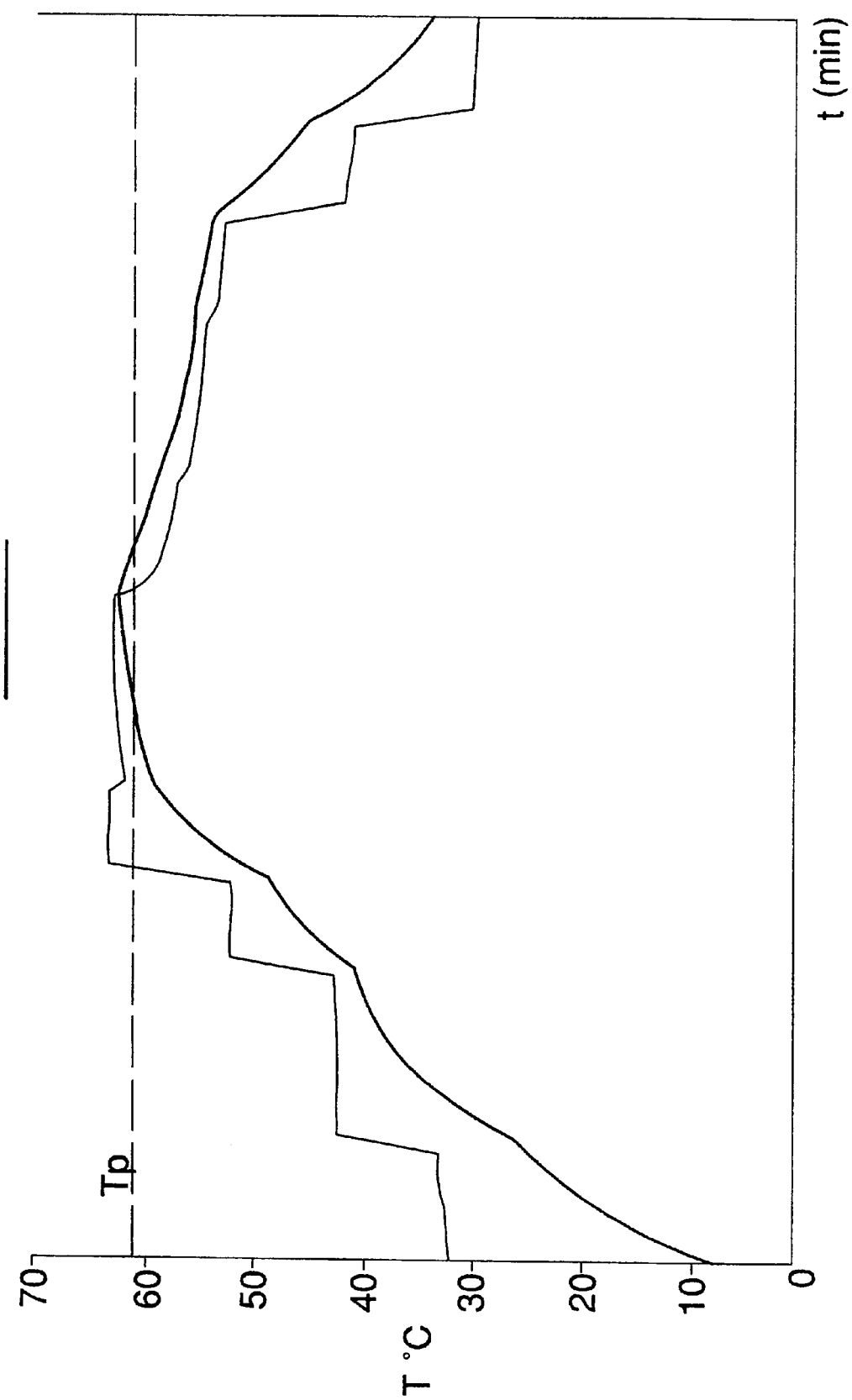
FIG. 5 shows a diagram of the pasteurization cycle according to the present invention (the bolder line relates to the product).

In this connection, it is interesting to compare the progression of the graphs for the product (bold lines) in FIGS. 3 and 5. As can be noted, the progression of the product temperature is entirely similar in both situations.

Figure 4:
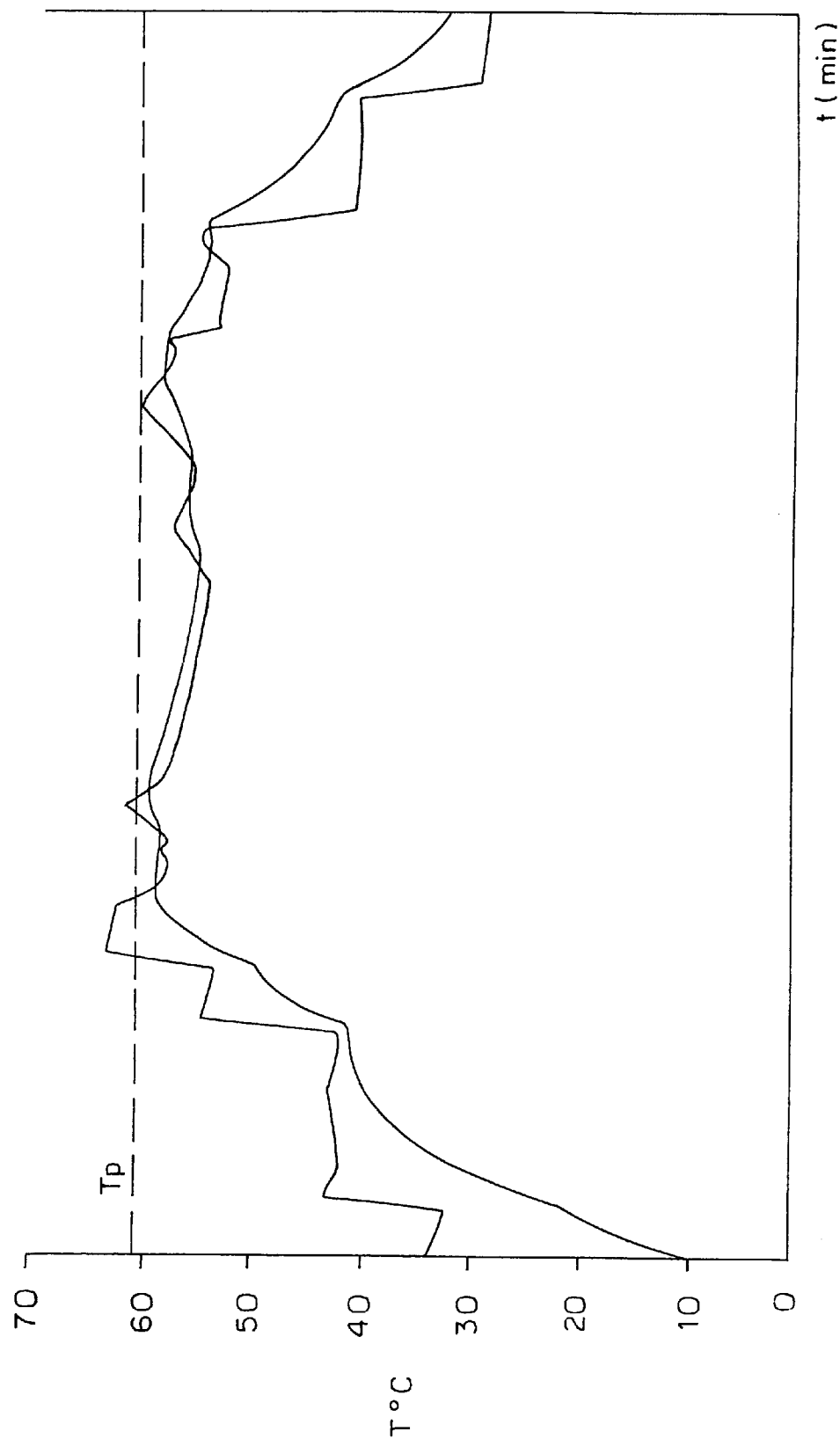
FIG. 4 shows a diagram of the pasteurization cycle according to the known art (the bolder line relates to the product)

FIG. 4 shows, on the other hand, the progression of a cycle during which the continuous detection of the number of PU's resulted in countless variations in the temperature value of the water of the spray jets, where the product was cooled and reheated several times. This is what happens with conventional systems.

FIG. 5 (relating to the present invention) shows that, at the moment of stoppage of the pasteurizer, the system reacted as described above: i.e. the product was heated and cooled once only, reached the pasteurization temperature Tp and (inside this zone) remained above the temperature Tp for the predefined period of time.

According to the present invention, the pasteurization heat treatment control system does not monitor the number of PU's (as conventionally happens), but monitors the progression of the temperature of each individual batch of containers in the zone 2 against the time which this batch of containers remains in this zone.

A not insignificant consequence is the considerable saving in thermal energy which is associated with the idea of the product being cooled and heated only once and the temperature of the sprinkler water being reduced only when necessary. On the other hand, in conventional systems each stoppage in the movement of the pasteurizer results in intervention involving the whole system, i.e. in reduction of the water temperature in all the heat treatment zones.

With this new system, intervention in the individual zones is completely dependent upon the thermal characteristics of the product and is entirely independent of mechanical stoppage in the movement of the conveyor.

Said system envisages, moreover, as mentioned above, consumption of thermal energy only in order to ensure correct execution of the heat treatment without continuous corrections.

Basically, therefore, this new pasteurization heat treatment control system, in the event of incorrect operation of the pasteurizer, regulates the heat cycle by means of monitoring of the temperature of the product in suitable zones of the pasteurizer and by means of an evaluation of the temperature values previously recorded upstream, intervening so as to ensure continuation and conclusion of the pasteurization heat treatment of the product part which has already entered into the heat treatment zone.

What is claimed:

1. A system for controlling the pasteurization heat treatment of a packaged food product in tunnel-type pasteurizers, comprising:

a pasteurization tunnel having a conveyor for feeding of the product;

the pasteurization tunnel being subdivided into three zones including a first zone for subheating, a second zone for heat treatment and a third zone for cooling of the product, said first, second and third zones each being subdivided along a length thereof into a plurality of thermally independent basic subzones;

wherein data detection and processing means are provided for measuring and recording a temperature of the product in each of said zones or basic subzones so that when the product reaches a pasteurization temperature for a first time, the product is kept at the pasteurization temperature for a given period of time depending on a type of the product to be pasteurized;

wherein the pasteurization temperature is thereafter lowered and remains low until the product has left the second zone of the pasteurization tunnel; and a graph for an entire pasteurization heat treatment has, along a length thereof, only one ascending heating zone followed by only one descending cooling zone.

2. The system as claimed in claim 1, wherein, when the product starts to pass through one of said zones, having already completed the product heat cycle, a temperature in said heat cycle having been measured and recorded by said detection and processing means in said one of said zones, the temperature will remain low if the temperature was in that state or will drop if the temperature was at a value higher than that of the temperature of the product entering into said one of said zones.

3. The system as claimed in claim 1, wherein, when the product starts to pass through one of said zones having a temperature lower that the pasteurization temperature the product is brought up to the pasteurization temperature and kept at the pasteurization temperature for a period of time necessary for completion of the pasteurization and subsequent cooling.

4. The system as claim in claim 1, wherein said given period of time is independent of movement and stoppage of said conveyor.

5. The system as claimed in claim 1, wherein the system includes:

a single heating stage for the product;

reaching the predefined pasteurization temperature;

keeping the product at said pasteurization temperature for said given period of time and, subsequently, a single cooling stage for the product.

* * * * *